United States Patent [19]

Gilmore

[11] Patent Number: 5,722,452
[45] Date of Patent: Mar. 3, 1998

[54] DISGUISED FUEL CUT-OFF THEFT PREVENTION DEVICE

[76] Inventor: Dolores H. Gilmore, 416 Kingscourt Dr. Apt. 111, Waterloo, Ontario, Canada, N2K 3N6

[21] Appl. No.: 703,135

[22] Filed: Aug. 27, 1996

[51] Int. Cl.⁶ .................................................. B60R 25/00
[52] U.S. Cl. .................. 137/354; 137/383; 251/129.04; 70/242; 70/256
[58] Field of Search .................. 251/129.04; 137/351, 137/354, 383; 70/242, 256

[56] References Cited

U.S. PATENT DOCUMENTS

| | | | |
|---|---|---|---|
| 3,182,709 | 5/1965 | Fisher | 137/383 X |
| 3,550,717 | 12/1970 | Doty, Jr. | 137/383 |
| 3,719,201 | 3/1973 | Minks et al. | 137/383 X |
| 4,582,108 | 4/1986 | Markow et al. | 137/351 X |
| 4,615,355 | 10/1986 | Garcia et al. | 137/383 |
| 4,663,626 | 5/1987 | Smith | 70/256 X |
| 4,957,273 | 9/1990 | Sears | 251/129.04 |
| 5,612,878 | 3/1997 | Joao et al. | 70/256 X |

Primary Examiner—Kevin Lee

[57] ABSTRACT

A disguised fuel cut-off theft prevention device including a valve having a first orientation for allowing the supply of gas from a fuel pump to an engine of a vehicle and a second orientation thus precluding the supply of fuel from the fuel pump to the engine of the vehicle, wherein the valve only resides in the second orientation thereof upon the receipt of an activation signal; a micro-receiver residing in a sticker having a top face, a bottom face, and a periphery formed therebetween, the sticker having an adhesive formed on the top face thereof for allowing the coupling thereof to a windshield of the vehicle, the micro-receiver having a first micro-wire connected to a power source and a second micro-wire electrically connected to the valve, the micro-receiver adapted to transmit an activation signal continuously to the solenoid upon the instantaneous receipt of a transmission signal via free space, the micro-receiver further adapted to cease the transmission signal only upon the subsequent instantaneous receipt of the transmission signal; and a transmitter including activation means situated thereon for allowing the deployment via free space of the transmission signal.

5 Claims, 3 Drawing Sheets

DISGUISED FUEL CUT-OFF THEFT PREVENTION DEVICE

BACKGROUND OF THE INVENTION

1. Field of the Invention

The present invention relates to a disguised fuel cut-off theft prevention device and more particularly pertains to disguising a vehicular theft prevention device which selectively precludes the flow of fuel to an engine of a vehicle.

2. Description of the Prior Art

The use of gas cut-off valves is known in the prior art. More specifically, gas cut-off valves heretofore devised and utilized for the purpose of preventing the theft of a vehicle are known to consist basically of familiar, expected and obvious structural configurations, notwithstanding the myriad of designs encompassed by the crowded prior art which have been developed for the fulfillment of countless objectives and requirements.

By way of example, U.S. Pat. No. 4,162,716 to Lisnow; U.S. Pat. No. 4,449,605 to Read; U.S. Pat. No. Des. 292,288 to Schwartz; U.S. Pat. No. 5,444,430 to McShane; U.S. Pat. No. 4,061,158 to Musial; and U.S. Pat. No. 4,549,569 to Taylor are provided as being of general interest.

In this respect, the disguised fuel cut-off theft prevention device according to the present invention substantially departs from the conventional concepts and designs of the prior art, and in so doing provides an apparatus primarily developed for the purpose of disguising a vehicular theft prevention device which selectively precludes the flow of fuel to an engine of a vehicle.

Therefore, it can be appreciated that there exists a continuing need for a new and improved disguised fuel cut-off theft prevention device which can be used for disguising a vehicular theft prevention device which selectively precludes the flow of fuel to an engine of a vehicle. In this regard, the present invention substantially fulfills this need.

SUMMARY OF THE INVENTION

In view of the foregoing disadvantages inherent in the known types of gas cut-off valves now present in the prior art, the present invention provides an improved disguised fuel cut-off theft prevention device. As such, the general purpose of the present invention, which will be described subsequently in greater detail, is to provide a new and improved disguised fuel cut-off theft prevention device which has all the advantages of the prior art and none of the disadvantages.

To attain this, the present invention essentially comprises a valve container with a cylindrical configuration having a front face, a rear face, and a periphery formed therebetween thus defining an interior space, the valve container having a first threaded aperture formed on the periphery adjacent the front face thereof for allowing coupling with a pipe connected to a fuel pump of a vehicle, a second threaded aperture formed on the periphery adjacent the rear face thereof, a third threaded aperture formed on the front face for allowing coupling with an engine of the vehicle via another pipe, and a mounting bracket comprising a strip of metal formed about the periphery of the valve container between the first threaded aperture and the second threaded aperture with a pair of bores situated in ends thereof for allowing coupling of the valve container within an engine compartment of the vehicle, the valve container further including a cylindrical compartment formed therein adjacent the first threaded aperture and the third threaded aperture with a first conduit formed between the cylindrical compartment and the first threaded aperture for providing communication therebetween and a second conduit formed between the cylindrical compartment and the third threaded aperture for providing communication therebetween, the cylindrical compartment further including a third conduit formed in axial alignment with the second conduit on an opposite side of the cylindrical compartment for providing communication with the interior space, the third conduit having an annular inset portion concentrically formed therein; a valve situated within the valve container comprising a solenoid coupled to the cylindrical compartment, the solenoid having an associated transducer situated within the third conduit with an annular bushing positioned therebetween within the annular inset portion, the transducer of the solenoid having a first unbiased orientation with an end thereof residing within the cylindrical compartment thus allowing the supply of fuel from the fuel pump to the engine of the vehicle and a biased second orientation with an end thereof residing within the second conduit thus precluding the supply of fuel from the fuel pump to the engine of the vehicle, wherein the transducer only resides in the second orientation thereof upon the receipt of an activation signal; a micro-receiver residing in a sticker having a top face, a bottom face, and a periphery formed therebetween, the sticker having an adhesive formed on the top face thereof for allowing the coupling thereof to a windshield of the vehicle, the micro-receiver having a first micro-wire connected to a power source comprising a battery and a second micro-wire extended through the second threaded aperture of the valve container and electrically connected to the solenoid, wherein a pipe surrounds the second micro-wire and is threadedly coupled with the second threaded aperture thus resembling the pipes connected to the fuel pump and engine, the micro-receiver adapted to transmit an activation signal continuously to the solenoid upon the instantaneous receipt of a transmission signal via free space, the micro-receiver further adapted to cease the transmission signal only upon the subsequent instantaneous receipt of the transmission signal; and a transmitter having a compact rectangular configuration, the transmitter further including a push button situated thereon for allowing the deployment via free space of the transmission signal upon the depression thereof.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved disguised fuel cut-off theft prevention device which has all the advantages of the prior art gas cut-off valves and none of the disadvantages.

It is another object of the present invention to provide a new and improved disguised fuel cut-off theft prevention device which may be easily and efficiently manufactured and marketed.

It is a further object of the present invention to provide a new and improved disguised fuel cut-off theft prevention device which is of a durable and reliable construction.

An even further object of the present invention is to provide a new and improved disguised fuel cut-off theft prevention device which is susceptible of a low cost of manufacture with regard to both materials and labor, and which accordingly is then susceptible of low prices of sale to the consuming public, thereby making such disguised fuel cut-off theft prevention device economically available to the buying public.

Still yet another object of the present invention is to provide a new and improved disguised fuel cut-off theft prevention device which provides in the apparatuses and methods of the prior art some of the advantages thereof, while simultaneously overcoming some of the disadvantages normally associated therewith.

Still another object of the present invention is to disguise a vehicular theft prevention device which selectively precludes the flow of fuel to an engine of a vehicle.

Lastly, it is an object of the present invention to provide a new and improved disguised fuel cut-off theft prevention device including a valve having a first orientation for allowing the supply of gas from a fuel pump to an engine of a vehicle and a second orientation thus precluding the supply of fuel from the fuel pump to the engine of the vehicle, wherein the valve only resides in the second orientation thereof upon the receipt of an activation signal; a micro-receiver residing in a sticker having a top face, a bottom face, and a periphery formed therebetween, the sticker having an adhesive formed on the top face thereof for allowing the coupling thereof to a windshield of the vehicle, the micro-receiver having a first micro-wire connected to a power source and a second micro-wire electrically connected to the valve, the micro-receiver adapted to transmit an activation signal continuously to the solenoid upon the instantaneous receipt of a transmission signal via free space, the micro-receiver further adapted to cease the transmission signal only upon the subsequent instantaneous receipt of the transmission signal; and a transmitter including activation means situated thereon for allowing the deployment via free space of the transmission signal.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

Similar reference characters refer to similar parts throughout the several views of the drawings.

DESCRIPTION OF THE PREFERRED EMBODIMENT

Figure 1:
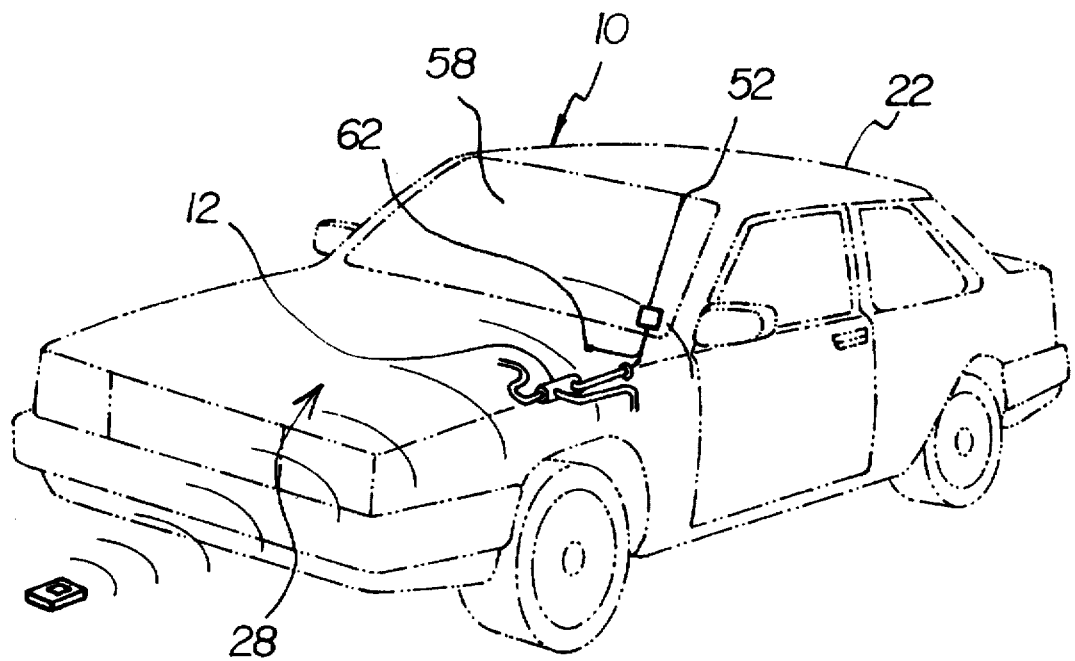
FIG. 1 is a perspective illustration of the preferred embodiment of the disguised fuel cut-off theft prevention device constructed in accordance with the principles of the present invention.
Figure 2:
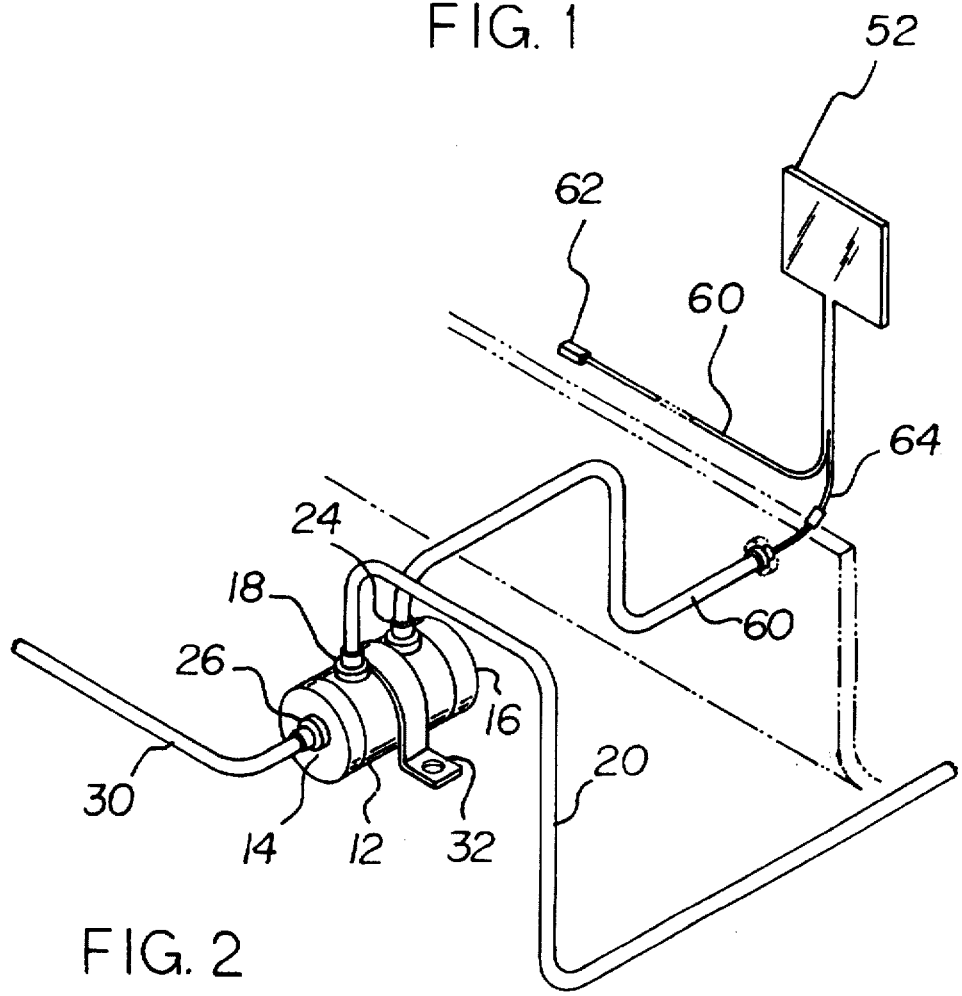
FIG. 2 is a close-up perspective view of the present invention excluding the transmitter.
Figure 3:
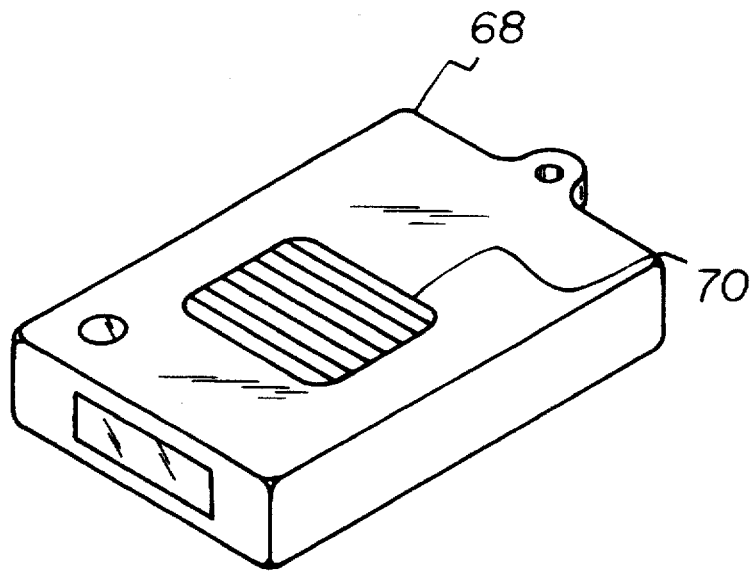
FIG. 3 is a top isometric view of the transmitter of the present invention.

With reference now to the drawings, and in particular to FIG. 1 thereof, a new and improved disguised fuel cut-off theft prevention device embodying the principles and concepts of the present invention and generally designated by the reference numeral 10 will be described.

The present invention, the new and improved disguised fuel cut-off theft prevention device, is comprised of a plurality of components. Such components in their broadest context include a valve container, a valve, a receiver, and a transmitter. Such components are individually configured and correlated with respect to each other so as to attain the desired objective.

More specifically, it will be noted that the system 10 of the present invention includes a valve container 12 with a cylindrical configuration. The valve container is constructed to resemble a fuel filter. The valve container includes a front face 14, a rear face 16, and a periphery formed therebetween thus defining an interior space. The valve container further has a first threaded aperture 18 formed on the periphery adjacent the front face thereof. The first threaded aperture serves to allow coupling with a pipe 20 connected to a fuel pump of a vehicle 22. A second threaded aperture 24 is formed on the periphery of the valve container adjacent the rear face thereof. Further included is a third threaded aperture 26 formed on the front face for allowing coupling with an engine 28 of the vehicle via another pipe 30. A mounting bracket 32 is included consisting of a strip of metal formed about the periphery of the valve container between the first threaded aperture and the second threaded aperture. A pair of bores are situated in ends of the mounting bracket for allowing coupling of the valve container within an engine compartment of the vehicle.

Figure 6:
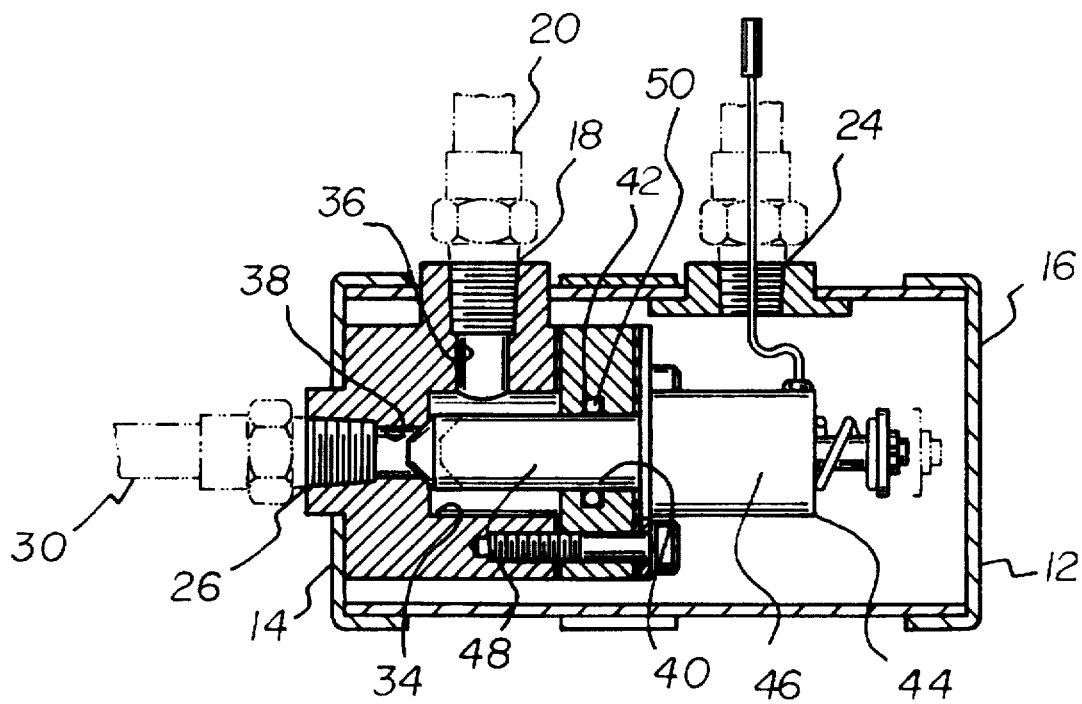
FIG. 6 is a cross-sectional view of the valve container taken along line 6—6 shown in FIG. 5.

As can best be shown in FIG. 6, the valve container further includes a cylindrical compartment 34 formed therein. Such cylindrical compartment resides adjacent the first threaded aperture and the third threaded aperture. A first conduit 36 is formed between the cylindrical compartment and the first threaded aperture for providing communication therebetween. A second conduit 38 is formed between the cylindrical compartment and the third threaded aperture for providing communication therebetween. For providing communication between the cylindrical compartment and the interior space, a third conduit 40 is formed in axial alignment with the second conduit on an opposite side of the cylindrical compartment. The third conduit has an annular inset 42 portion concentrically formed therein.

Further provided is a valve 44 situated within the valve container comprising a solenoid 46 coupled to the cylindrical compartment. The solenoid has an associated transducer 48 situated within the third conduit with an annular bushing positioned therebetween. The annular bushing 50 resides within the annular inset portion of the third component. In use, the transducer of the solenoid has a first unbiased orientation with an end thereof residing within the cylindrical compartment. In such an orientation, the transducer allows the supply of fuel from the fuel pump to the engine of the vehicle. For precluding the supply of fuel from the fuel pump to the engine of the vehicle, the transducer further has a biased second orientation with an end thereof residing within the second conduit. The transducer only resides in the second orientation thereof upon the receipt of an activation signal. Ideally, the end of the transducer has a conical configuration for completely sealing the second conduit.

Figure 4:
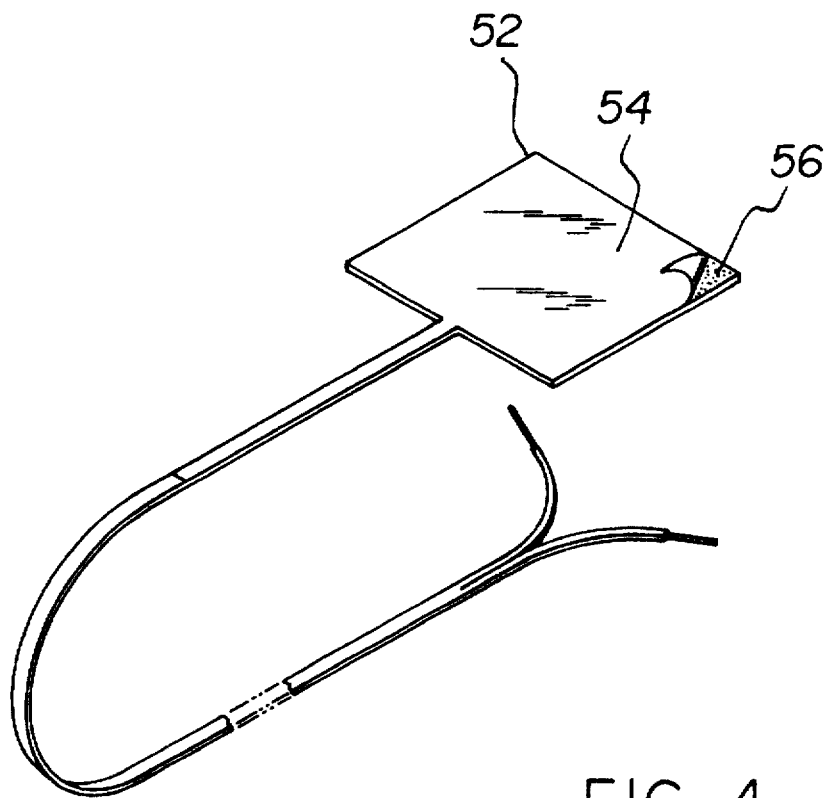
FIG. 4 is a perspective illustration of the micro-receiver and associated sticker.
Figure 5:
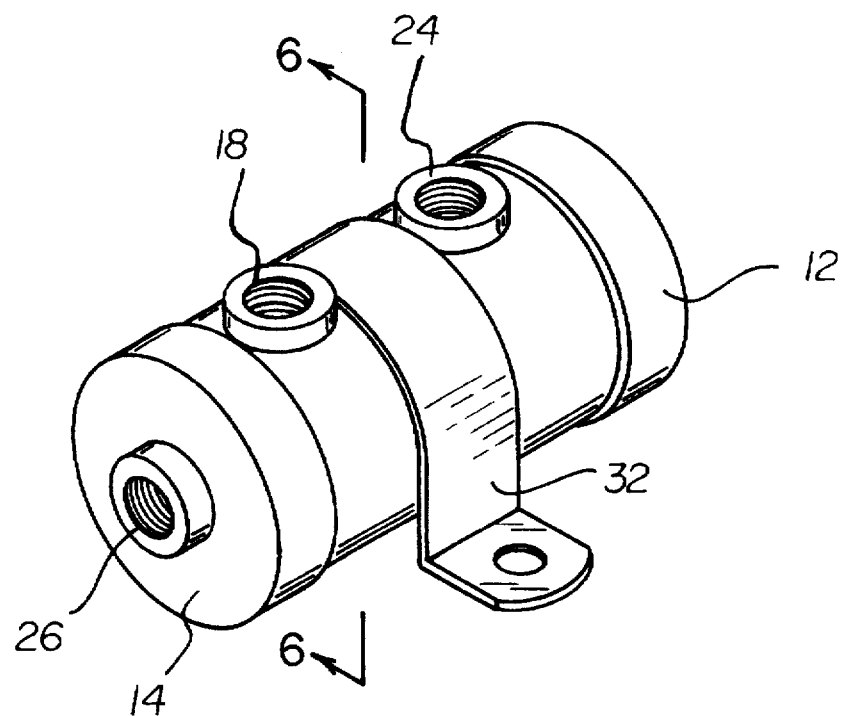
FIG. 5 is an exploded view of the valve container and associated mounting bracket.

As shown in FIG. 4, a micro-receiver 52 resides in a sticker 54 having a top face, a bottom face, and a periphery formed therebetween. Preferably, the sticker is opaque and has indicia printed thereon. Such indicia preferably indicates that the vehicle is protected by an alarm. The sticker has an adhesive 56 formed on the top face thereof for allowing the coupling thereof to a windshield 58 of the vehicle. The micro-receiver includes a first micro-wire 60 connected to a power source 62 comprising a battery. A second micro-wire 64 is extended through the second threaded aperture of the valve container and electrically connected to the solenoid. A pipe 66 surrounds the second micro-wire and is threadedly coupled with the second threaded aperture. As such, the pipe 66 resembles the pipes connected to the fuel pump and engine. The micro-receiver is adapted to transmit an activation signal continuously to the solenoid upon the instantaneous receipt of a transmission signal via free space. The micro-receiver is further adapted to cease the transmission signal only upon the subsequent instantaneous receipt of the transmission signal. The micro-receiver essentially comprises a small receiver and a switch which may take the form of a transistor.

Finally, a transmitter 68 is included having a compact rectangular configuration. The transmitter includes a push button 70 situated thereon. Such push button is included for allowing the deployment via free space of the transmission signal upon the depression thereof. As an option, an eyelet may be integrally formed on the transmitter for allowing it to be totted on an article of clothing, key ring, or the like. Also, a light emitting diode may be included for indicating that the transmission signal was, indeed, deployed upon the depression of the push button.

The present invention is ant-theft device which operates by cutting off the fuel supply to the engine after a preset duration of time has elapsed after the vehicle is started up. The present invention thus limits the distance that a thief may drive. In order to prevent would-be thieves from detecting and disarming the system, the fuel line cut-off valve is disguised to look like a fuel filter and the receiver is hidden in an anti-theft warning sticker.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved disguised fuel cut-off theft prevention device comprising, in combination:

a valve container with a cylindrical configuration having a front face, a rear face, and a periphery formed therebetween thus defining an interior space, the valve container having a first threaded aperture formed on the periphery adjacent the front face thereof for allowing coupling with a pipe connected to a fuel pump of a vehicle, a second threaded aperture formed on the periphery adjacent the rear face thereof, a third threaded aperture formed on the front face for allowing coupling with an engine of the vehicle via another pipe, and a mounting bracket comprising a strip of metal formed about the periphery of the valve container between the first threaded aperture and the second threaded aperture with a pair of bores situated in ends thereof for allowing coupling of the valve container within an engine compartment of the vehicle, the valve container further including a cylindrical compartment formed therein adjacent the first threaded aperture and the third threaded aperture with a first conduit formed between the cylindrical compartment and the first threaded aperture for providing communication therebetween and a second conduit formed between the cylindrical compartment and the third threaded aperture for providing communication therebetween, the cylindrical compartment further including a third conduit formed in axial alignment with the second conduit on an opposite side of the cylindrical compartment for providing communication with the interior space, the third conduit having an annular inset portion concentrically formed therein;

a valve situated within the valve container comprising a solenoid coupled to the cylindrical compartment, the solenoid having an associated transducer situated within the third conduit with an annular bushing positioned therebetween within the annular inset portion, the transducer of the solenoid having a first unbiased orientation with an end thereof residing within the cylindrical compartment thus allowing the supply of fuel from the fuel pump to the engine of the vehicle and a biased second orientation with an end thereof residing within the second conduit thus precluding the supply of fuel from the fuel pump to the engine of the vehicle, wherein the transducer only resides in the second orientation thereof upon the receipt of an activation signal;

a micro-receiver residing in a sticker having a top face, a bottom face, and a periphery formed therebetween, the sticker having an adhesive formed on the top face thereof for allowing the coupling thereof to a windshield of the vehicle, the micro-receiver having a first micro-wire connected to a power source comprising a battery and a second micro-wire extended through the second threaded aperture of the valve container and electrically connected to the solenoid, wherein a pipe surrounds the second micro-wire and is threadedly coupled with the second threaded aperture thus resembling the pipes connected to the fuel pump and engine, the micro-receiver adapted to transmit an activation signal continuously to the solenoid upon the instantaneous receipt of a transmission signal via free space, the micro-receiver further adapted to cease the transmission signal only upon the subsequent instantaneous receipt of the transmission signal; and a transmitter having a compact rectangular configuration, the transmitter further including a push button situated thereon for allowing the deployment via free space of the transmission signal upon the depression thereof.

2. A disguised fuel cut-off theft prevention device comprising:

a valve having a first orientation for allowing the supply of gas from a fuel pump to an engine of a vehicle and a second orientation thus precluding the supply of fuel from the fuel pump to the engine of the vehicle, wherein the valve only resides in the second orientation thereof upon the receipt of an activation signal;

a micro-receiver residing in a sticker having a top face, a bottom face, and a periphery formed therebetween, the sticker having an adhesive formed on the top face thereof for allowing the coupling thereof to a windshield of the vehicle, the micro-receiver having a first micro-wire connected to a power source and a second micro-wire electrically connected to the valve, the micro-receiver adapted to transmit an activation signal continuously to the solenoid upon the instantaneous receipt of a transmission signal via free space, the micro-receiver further adapted to cease the transmission signal only upon the subsequent instantaneous receipt of the transmission signal; and a transmitter including activation means situated thereon for allowing the deployment via free space of the transmission signal.

3. A disguised fuel cut-off theft prevention device as set forth in claim 2 and further including a valve container for containing the valve with a cylindrical configuration having a front face, a rear face, and a periphery formed therebetween thus defining an interior space, the valve container having a first threaded aperture formed on the periphery adjacent the front face thereof for allowing coupling with a pipe connected to the fuel pump of the vehicle, a second threaded aperture formed on the periphery adjacent the rear face thereof, a third threaded aperture formed on the front face for allowing coupling with the engine of the vehicle via another pipe, and a mounting bracket for allowing coupling of the valve container within an engine compartment of the vehicle, wherein the second micro-wire is extended through the second threaded aperture of the valve container and a pipe surrounds the second micro-wire which is threadedly coupled with the second threaded aperture thus resembling the pipes connected to the fuel pump and engine.

4. A disguised fuel cut-off theft prevention device as set forth in claim 3 wherein the valve housing further includes a cylindrical compartment formed therein adjacent the first threaded aperture and the third threaded aperture with a first conduit formed between the cylindrical compartment and the first threaded aperture for providing communication therebetween and a second conduit formed between the cylindrical compartment and the third threaded aperture for providing communication therebetween, the cylindrical compartment further including a third conduit formed in axial alignment with the second conduit on an opposite side of the cylindrical compartment for providing communication with the interior space, the third conduit having an annular inset portion concentrically formed therein, the valve including a solenoid coupled to the cylindrical compartment, the solenoid having an associated transducer situated within the third conduit with an annular bushing positioned therebetween within the annular inset portion.

5. A valve container resembling a fuel pump adapted to contain a valve for selectively precluding the supply of fuel to an engine of a vehicle comprising a front face, a rear face, and a periphery formed therebetween thus defining an interior space, the valve container having a first threaded aperture formed on the periphery adjacent the front face thereof for allowing coupling with a pipe connected to a fuel pump of a vehicle, a second threaded aperture formed on the periphery adjacent the rear face thereof, a third threaded aperture formed on the front face for allowing coupling with an engine of the vehicle via another pipe, and a mounting bracket for allowing coupling of the valve container within an engine compartment of the vehicle.

* * * * *